United States Patent
Dengel et al.

(10) Patent No.: US 9,151,489 B2
(45) Date of Patent: Oct. 6, 2015

(54) POWER PLANT

(75) Inventors: Andreas Dengel, Neunkirchen (DE); Heinz-Kurt Dörr, St. Ingbert-Hassel (DE)

(73) Assignee: STEAG New Energies GmbH, Saarbrucken (DE)

(*) Notice: Subject to any disclaimer, the term of this patent is extended or adjusted under 35 U.S.C. 154(b) by 867 days.

(21) Appl. No.: 11/886,795

(22) PCT Filed: Mar. 14, 2006

(86) PCT No.: PCT/EP2006/002288
§ 371 (c)(1),
(2), (4) Date: Sep. 20, 2007

(87) PCT Pub. No.: WO2006/099962
PCT Pub. Date: Sep. 28, 2006

(65) Prior Publication Data
US 2009/0031696 A1  Feb. 5, 2009

(30) Foreign Application Priority Data
Mar. 21, 2005 (DE) .................. 10 2005 012 902

(51) Int. Cl.
F02B 43/00 (2006.01)
F22B 33/18 (2006.01)
F22B 31/00 (2006.01)
F23L 7/00 (2006.01)

(52) U.S. Cl.
CPC ............ *F22B 33/18* (2013.01); *F22B 31/00* (2013.01); *F23L 7/007* (2013.01); *Y02E 20/344* (2013.01)

(58) Field of Classification Search
CPC ......... F22B 31/00; F22B 33/18; F23L 7/007; Y02E 20/344; F02C 3/20; F02C 3/22; F02C 3/30
USPC ......... 60/39.12, 39.465, 779, 39.091, 39.094, 60/659, 670; 220/745–750
See application file for complete search history.

(56) References Cited

U.S. PATENT DOCUMENTS

| | | | |
|---|---|---|---|
| 3,311,097 A * | 3/1967 | Mittelstaedt | 123/537 |
| 4,003,204 A | 1/1977 | Bradley | |
| 4,074,708 A | 2/1978 | Hochmuth | |
| 4,175,381 A * | 11/1979 | Scragg et al. | 60/39.12 |
| 5,665,317 A | 9/1997 | Laslo | 422/171 |
| 5,928,615 A * | 7/1999 | Strock et al. | 422/231 |
| 6,079,212 A * | 6/2000 | Tatani et al. | 60/694 |
| 6,505,467 B1 * | 1/2003 | Fjellhaug et al. | 60/780 |
| 6,623,714 B2 * | 9/2003 | Shreiber et al. | 423/219 |
| 2001/0008066 A1 * | 7/2001 | Liebig | 60/39.02 |

FOREIGN PATENT DOCUMENTS

| | | |
|---|---|---|
| GB | 1212905 | 11/1970 |
| JP | 60/223905 | 11/1985 |
| JP | 11/072028 | 3/1999 |

* cited by examiner

*Primary Examiner* — Phutthiwat Wongwian
*Assistant Examiner* — Vikansha Dwivedi
(74) *Attorney, Agent, or Firm* — James Creighton Wray; Meera P. Narasimhan

(57) ABSTRACT

An electrolytic power plant using an electrolysis device which requires one part of the electric energy which is produced by the power plant. The electrolysis device forms a variable load for the constant control network frequency and produces hydrogen and oxygen. The power plant has an oxygen pump, a buffer container, an oxygen distribution line, and an oxygen pump that are used for the accumulated oxygen.

3 Claims, 1 Drawing Sheet

POWER PLANT

This application claims the benefit of German Application No. 10 2005 012 902.1 filed Mar. 21, 2005 and PCT/EP2006/002288 filed Mar. 14, 2006, which are hereby incorporated by reference in their entirety.

The invention concerns a power plant featuring an electrolysis device which produces hydrogen and oxygen consuming a part of the electrical energy produced by the power plant.

A power plant such as this is described In the German patent application 10 2005 001 009.1 of the applicant, which is incorporated herein by reference. Charges built by electrolytic devices can be connected and disconnected within the frame of the so-called primary control in order to keep the power frequency constant. The above-mentioned patent application concerns the different possibilities of use for the hydrogen generated during the electrolysis, in particular its use as energy source.

SUMMARY OF THE INVENTION

It is an object of the invention to find a broader use for the electrolysis products generated in a power plant of the kind described above.

The power plant with which the object of the invention is attained has devices for recycling the oxygen generated during the electrolysis.

While the use of the generated oxygen could merely consist of collecting and filling as well as distributing oxygen gas as such, in a preferred embodiment of the invention the generated oxygen serves for the operation of the power plant itself. Accordingly, the power plant has preferably devices for guiding the oxygen to a consumer within the power plant.

Especially, devices for guiding oxygen into the combustion chamber of a steam generator or/and into a flue gas desulfurization plant can be provided. The supply of oxidizing agents to the combustion chamber is optimized by means of the oxygen that is specifically introduced together with the exhaust gas into specific areas of the combustion chamber.

The use of pure oxygen for the oxidation of calcium sulfite into calcium sulfate in the flue gas desulfurization plant allows using smaller reaction chambers and accordingly requires a lesser construction effort for the flue gas desulfurization plant in contrast with the use of air.

In order to supplement the supply of the combustion chamber with oxidizing agents are provided in particular devices for guiding oxygen into areas of the combustion chamber that are not adequately supplied with oxygen.

These areas are located within the combustion chamber, for example, a tangential or boxer firing, close to the inlets for fuel and combustion air, for example, closely over the inlets.

Guiding devices for introducing oxygen into an area of the combustion chamber are preferably provided, in which the flame front reaches the wall of the combustion chamber.

In it, the supplementary supply with oxygen (or air highly enriched with oxygen) prevents any undesirable chemical reactions between gases within the combustion engine and the wall material of the steam generator, predominantly in the area of the combustion chamber that is particularly inadequately supplied with oxygen. These reactions affect to a considerable extent the material properties and lead finally to a destruction of the wall of the steam generator in the affected areas. Costly repairs and down times are the consequence of this. Because damaging reactions between combustion gases and the wall material are largely prevented by means of the additional oxygen supply, the expenditure for repairs on the steam generator can be reduced and its service life can ultimately be extended.

The introduction of oxygen into the mentioned area can be carried out by means of a closed circular pipeline or several closed circular pipelines, in which inlets are provided, which are distributed over the periphery of the closed circular pipeline.

The invention will be described in more detail in the following with regard to an exemplary embodiment and the enclosed drawings, which refer to this embodiment, wherein:

DETAILED DESCRIPTION

Figure 1:
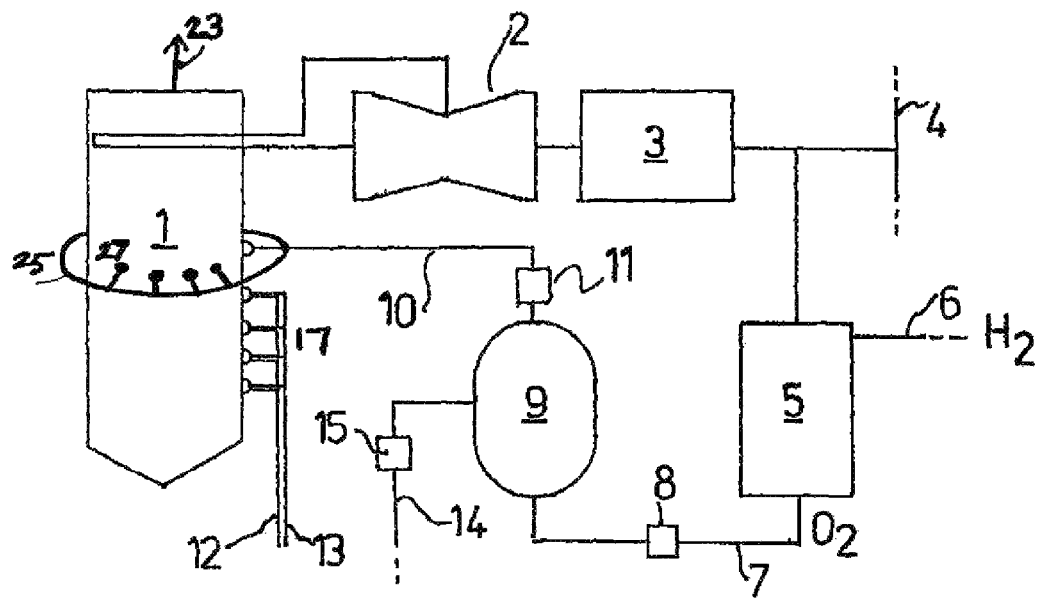
FIG. 1 shows a schematic representation of a power plant according to the invention.

The power plant comprises a steam generator 1, a turbine 2, and a generator 3. The generator 3 delivers electric energy to an electricity grid 4. A part of the electric energy generated by the power plant is consumed by an electrolysis device 5, which generates hydrogen and oxygen and builds a load that can be varied in order to keep constant the grid frequency, as described in the German patent application 10 2005 001 009.1.

A line 6 serves for the discharge of the hydrogen generated by the electrolysis device 5. Oxygen is discharged with a pump 8 via a line 7 and transferred into a buffer container 9.

Oxygen can be transferred from the buffer container 9 into the combustion chamber of the steam generator 1 via a line 10 and a pump 11. Fuel and combustion air are introduced according to a tangential firing at four levels into the steam generator 1 through inlets arranged underneath the inlets for the oxygen in the corresponding exemplary embodiment, while the combustion air is transported via a line 12 and the fuel, which is a coal dust and air mixture, is transported via a line 13. The buffer container 9 is further connected via a line 14 and a pump 15 to a flue gas desulfurization plant 20, which is depicted in FIG. 3.

Fuel and air injectors 17 supply fuel and air to steam generator 1. Flue gas 23 is exhausted. A ring 25 of oxygen injectors 27 supplies oxygen from line 10 to the steam generator 1.

Figures 2, 3:
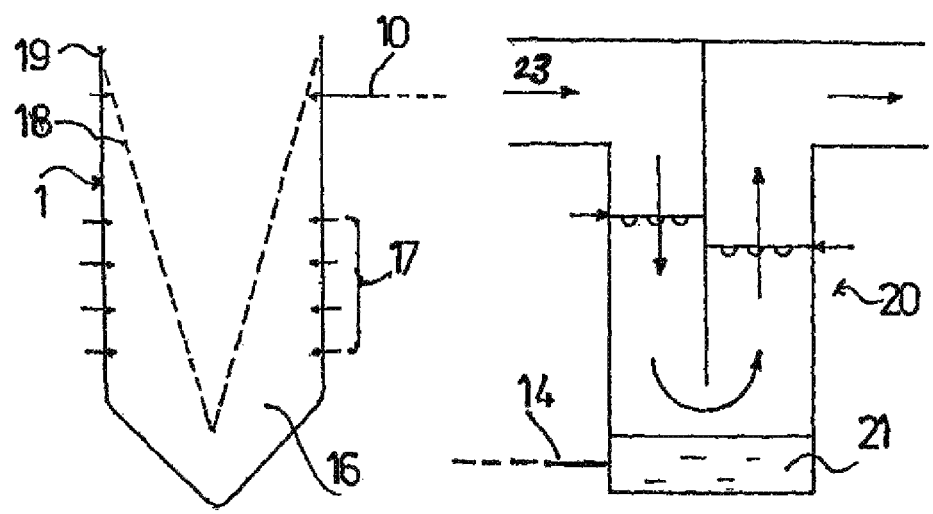
FIG. 2 shows a schematic partial representation of a steam generator used in the power plant of FIG. 1.
FIG. 3 shows a schematic representation of a flue gas desulfurization plant of the power plant of FIG. 1.

As can be seen in FIG. 2, the oxygen is inducted into the combustion chamber 16 of the steam generator 1 at a height in which a flame front 18 reaches the wall 19 of the steam generator. An inadequate supply of oxygen existing in this area is advantageously compensated by feeding oxygen. Chemical reactions between gases within the combustion chamber 16 and the material of the wall 19 are prevented.

A circular pipeline can be provided in order to introduce oxygen into the combustion chamber 16, while branch lines leading into the combustion chamber are formed, which are distributed over the periphery of the circular pipeline. An oxygen mist that covers the inner wall of the combustion chamber as evenly as possible is suitably generated.

The calcium sulfite ($CaSO_3$) is oxidized by means of oxygen, which is fed to the sump via the line 14, and is converted into calcium sulfate ($CaSO_4$) in the sump 21 of a flue gas desulfurization plant 20 shown in FIG. 3.

The invention claimed is:

1. A power plant comprising an electrolysis device which requires one part of electrical energy which is produced by the power plant to produce hydrogen and oxygen, the power plant further comprising removing devices for removing the hydrogen and a steam generator providing a combustion chamber which is operated with fuel and combustion air and guiding devices for guiding the produced oxygen additionally to the combustion air into areas of the combustion chamber that are inadequately supplied with oxygen, wherein the guiding devices are provided for introducing the oxygen into the combustion chamber close to an inlet area for the fuel and the combustion air or for introducing the oxygen into an area of the combustion chamber in which a flame front reaches a wall of the combustion chamber such that undesirable chemical reactions between gases within the combustion chamber and wall material of the steam generator are prevented.

2. The power plant of claim 1, wherein a circular pipeline or several such circular pipelines that surround the steam generator are provided with branch lines, which are distributed over the circular periphery and lead into the combustion chamber in order to introduce oxygen.

3. The power plant of claim 1, further comprising a flue gas desulfurization plant which is provided for desulfurization of flue gases produced by the power plant, and devices for guiding the produced oxygen into the flue gas desulfurization plant in order to use the produced oxygen for desulfurization.

\* \* \* \* \*